United States Patent
Cheng

(10) Patent No.: US 11,522,421 B2
(45) Date of Patent: Dec. 6, 2022

(54) RADIALLY ANISOTROPIC MULTIPOLAR SOLID MAGNET, AND PRODUCTION METHOD AND DEVICE THEREOF

(71) Applicant: Shenzhen Radimag Magnets Co.,Ltd, Shenzhen (CN)

(72) Inventor: Wenhao Cheng, Shenzhen (CN)

(73) Assignee: Shenzhen Radimag Magnets Co., Ltd, Shenzhen (CN)

( * ) Notice: Subject to any disclaimer, the term of this patent is extended or adjusted under 35 U.S.C. 154(b) by 312 days.

(21) Appl. No.: 16/887,976

(22) Filed: May 29, 2020

(65) Prior Publication Data
US 2020/0395828 A1    Dec. 17, 2020

(30) Foreign Application Priority Data
Jun. 11, 2019    (CN) .......................... 201910502347.9

(51) Int. Cl.
  *H02K 15/03*    (2006.01)
  *H02K 1/2726*    (2022.01)
  *H02K 1/30*    (2006.01)

(52) U.S. Cl.
  CPC .......... *H02K 15/03* (2013.01); *H02K 1/2726* (2013.01); *H02K 1/30* (2013.01)

(58) Field of Classification Search
  CPC ........ H02K 15/03; H02K 1/2726; H02K 1/30; H02K 2213/03; H02K 1/02; H02K 1/2733; H01F 41/028
  See application file for complete search history.

(56) References Cited

U.S. PATENT DOCUMENTS

| | | | |
|---|---|---|---|
| 4,954,800 A | 9/1990 | Ohtsuka | |
| 2010/0259122 A1* | 10/2010 | Takehara | H02K 21/22 310/156.01 |
| 2020/0090844 A1* | 3/2020 | Hagiwara | H02K 7/003 |

FOREIGN PATENT DOCUMENTS

| | | |
|---|---|---|
| CN | 200947369 Y | 9/2007 |
| CN | 101162646 A | 4/2008 |
| CN | 201069705 Y | 6/2008 |
| WO | 2018088393 A1 | 5/2018 |

* cited by examiner

*Primary Examiner* — Thomas Truong
(74) *Attorney, Agent, or Firm* — Dragon Sun Law Firm, PC; Jinggao Li; Nathaniel Perkins

(57) ABSTRACT

The present disclosure provides a molding method, a manufacturing method and a molding device for a radially anisotropic multipolar solid magnet, a micro-motor rotor using this magnet, and a component for a motor. A mold core is removed from a mold, and oriented poles, the number of which is the same as that of poles of a radially anisotropic multipolar solid cylindrical magnet, are arranged outside the mold. The sum L of widths or arc lengths of top ends of all the oriented poles is greater than or equal to $0.9\pi D$, where D is the outer diameter of a mold sleeve. The magnet production method breaks through the dimensional restriction to the manufacturing of radially anisotropic multipolar magnets in the prior art, and can produce radially anisotropic multipolar magnets having an inner diameter or diameter less than 3 mm or even less for high-precision micro-motors.

17 Claims, 3 Drawing Sheets

RADIALLY ANISOTROPIC MULTIPOLAR SOLID MAGNET, AND PRODUCTION METHOD AND DEVICE THEREOF

CROSS-REFERENCE TO RELATED APPLICATION

The present application claims priority to Chinese Patent Application No. 201910502347.9 filed to the CNIPA on Jun. 11, 2019 and entitled RADIALLY ANISOTROPIC MULTIPOLAR SOLID MAGNET AND PRODUCTION METHOD AND DEVICE THEREOF, the disclosure of which is hereby incorporated by reference in its entirety.

TECHNICAL FIELD

The present disclosure belongs to the field of permanent magnetic materials, and relates to a radially anisotropic multipolar solid cylindrical magnet, a production method and device thereof, and a micro-motor rotor and motor component using this magnet.

BACKGROUND OF THE PRESENT DISCLOSURE

As a kind of indispensable functional materials, permanent magnetic materials play a very important role in the field of small- and medium-sized motors, particularly micro-motors. Miniaturization and microminiaturization are the current development trends in industries such as automatic devices, intelligent devices and robots. Miniature devices require micro-motors, and miniature magnetic components (e.g., permanent magnetic rotors) are required during the production of micro-motors. Radially-oriented magnet rings (referred to as radial rings) and radially anisotropic multipolar magnet rings (referred to as multipolar rings) are two kinds of permanent magnets commonly used during the production of high-precision micro-motors.

As automation and intellectualization become development trends, there are high demands for permanent magnetic motors with small size, light weight, high precision and energy-saving in the market. The main way to realize high precision of motors is the use of radially anisotropic magnets in permanent magnetic motors. However, the manufacturing of radially anisotropic multipolar magnets having an inner diameter or diameter less than 3 mm or even less has always been a challenge in the industry.

In existing processes for producing radial rings and multipolar rings, for example the inventor's earlier applications CN200710106670.1, CN200810066269.4 or the like, a mold core, which is magnetic conducting and made of a ferromagnetic material, must be arranged in the center of a mold (or a model), so that radially anisotropic multipolar magnetic rings can be produced. The radially anisotropic cylindrical magnet described in the representative Patent CN1420504 by Shin Etsu is manufactured by a mold with a mold core, and is also a ring magnet. In CN201410674356.3, magnetic particles are oriented by moving the magnetic particles but keeping the magnetic field unmoved, the magnetic particles are surface-scanned by converging the front end of the magnetic field to greatly expand the range of orientation of the magnetic field. However, its purpose is to produce platy magnetic steel with large area or ring or tile-shaped magnets with large height. Ring magnets having a minimum inner diameter of 15 mm are produced by rotational molding. Therefore, this method is not suitable for the production of ring magnets with a small diameter or inner diameter.

Therefore, a heretofore unaddressed need exists in the art to address the aforementioned deficiencies and inadequacies.

SUMMARY OF THE PRESENT DISCLOSURE

To break through the dimensional restriction to the manufacturing of radially anisotropic multipolar magnets in the prior art and produce radially anisotropic multipolar magnets having an inner diameter or diameter less than 3 mm or even less for high-precision micro-motors, the present disclosure provides a novel method suitable for large-scale production of radially anisotropic multipolar solid cylindrical magnets. The radially anisotropic multipolar solid cylindrical magnet can be directly used as a micro-motor rotor, or can be mounted, as a component for providing a permanent magnetic field, on a motor shaft made from other metal materials by forming a hole with a desired inner diameter (any arbitrarily small inner diameter) in the center of the magnet.

In the method provided by the present disclosure, the "mold core" as described in CN 200710106670.1, CN 200810066269.4, CN1420504 or the like is removed; oriented poles, the number of which is the same as that of poles of the radially anisotropic multipolar solid cylindrical magnet, are arranged outside a mold; and the sum L of widths or arc lengths of outer oriented poles is set to be greater than $0.7\pi D$, preferably greater than or equal to $0.9\pi D$, where D is the outer diameter of a mold sleeve. In this way, a radially anisotropic multipolar solid cylindrical magnet is obtained.

In this method, during and after the application of a magnetic field to magnetic particles, it is not required to rotate the magnetic particles in both the mold and a cavity thereof, and it is also not required to rotate the orientated magnetic field. This is significantly different from the molding processes described in CN 200710106670.1, CN 200810066269.4 CN1420504, CN201410674356.3 or the like.

This method specifically includes following steps of:
(1) preparing a mold without a mold core;
(2) arranging, around the prepared mold, oriented poles, the number of which is the same as that of poles of the radially anisotropic multipolar solid cylindrical magnet, the sum L of widths or arc lengths of top ends of the outer oriented poles being greater than or equal to $0.9\pi D$, where L is the sum of widths (or arc lengths) of top ends of the outer oriented poles and D is the outer diameter of a sleeve; filling anisotropic magnetic particles in a mold cavity, and moving an upper ram of the mold to a position in the mold cavity at the same height as upper edge of poles for an oriented magnetic field or a position slightly lower than the upper edge of the poles for the oriented magnetic field, wherein this position ensures that the magnetic particles in the mold cavity are fully magnetized after the application of the magnetizing magnetic field and will not flow out of the mold cavity during the magnetization of the magnetic particles in the mold cavity by the magnetizing magnetic field, and the quality of the magnetic particles in the mold cavity should ensure that the magnetic particles have a degree of freedom high enough to make easy directions of magnetization arranged in the magnetic field orderly;
(3) applying a first magnetic field to fully magnetize the magnetic particles in the mold cavity;
(4) applying a second magnetic field, applying an increased stress to the magnetic particles in the mold cavity by both the upper and lower rams and maintaining this stress for a certain period of time to obtain a blank; or, by keeping the lower ram unmoved, moving the upper ram down to apply an increased stress to the magnetic particles in the mold cavity and maintaining this stress for a certain period of time, the stress being preferably 20 MPa to 200 MPa;

(5) In the step (4), when the magnetic particles cannot recover to an out-of-order state before orientation after leaving the oriented magnetic field, applying a third magnetic field, and continuously applying a stress by the rams until the blank has a desired density;

(6) applying a fourth magnetic field to demagnetize the blank; and preferably, applying a reverse magnetic field to the blank in the mold cavity to demagnetize the blank, or applying a forward/reverse alternating magnetic field to demagnetize the blank in the mold; and (7) stopping the application of stress, and demolding.

In the step (3), a magnetic field generation device firstly applies a first magnetic field to fully magnetize the magnetic particles in the mold cavity. The higher the intensity of the magnetic field is, the higher the degree of magnetization of the magnetic particles is.

In the step (4), the second magnetic field is applied to align the easy directions of magnetization of the magnetic particles in the mold cavity along the oriented magnetic field. Since the arc magnetic field around the poles will be higher in intensity if the intensity of the magnetic field is higher, which affects the alignment of the magnetic particles along the oriented magnetic field, the intensity of the second magnetic field should be lower than that of the first magnetic field, that is, the intensity of the first magnetic field is 1 to 3 times of that of the second magnetic field.

In the step (4), during the application of the second magnetic field, a gradually increased stress is applied to the magnetic particles until the stress is increased to a certain level at which the magnetic particles in the mold cavity are aligned along the oriented magnetic field.

When the magnetic particles cannot recover to an out-of-order state before orientation after leaving the oriented magnetic field, a third magnetic field is applied. In this stage, the anisotropic magnetic particles in the mold cavity have been aligned along the oriented magnetic field. To save energy and to facilitate the application of a four magnetic field to the blank, the intensity of the third magnetic field is 1 to 0 times of that of the second magnetic field.

The stress is continuously applied by the rams until the blank in the mold has a desired density. The magnetic field generation device applies a fourth magnetic field to demagnetize the blank. Preferably, the fourth magnetic field is a reverse magnetic field having an intensity that is 0.5 to 0.01 times of that of the second magnetic field or a forward/reverse alternating magnetic field.

The application of stress is stopped, and demolding is performed to obtain the blank of the radially anisotropic multipolar solid cylindrical magnet.

The mold used in the present disclosure includes a cavity, an upper ram and a lower ram, without a mold core. The oriented magnetic field generation device includes an even number ($\geq 2$) of outer oriented poles arranged outside the mold cavity. The number of the oriented poles is equal to that of poles of the radially anisotropic multipolar solid cylindrical magnet.

Furthermore, the present disclosure further provides a method for manufacturing a radially anisotropic multipolar solid cylindrical sintered magnet, including steps of:

(1) producing a blank of the radially anisotropic multipolar solid cylindrical magnet by the method provided in the present disclosure; and (2) sintering and aging the blank, preferably including specific steps of:
(i) vacuumizing in advance;
(ii) heating, while vacuumizing, to a sintering temperature of 1000° C. to 1150° C.;
(iii) sintering in vacuum and maintaining the temperature;
(iv) feeding an inert gas and cooling; and
(v) aging at 400° C. to 600° C., or aging at about 850° C. to 950° C. and then aging at 400° C. to 600° C.

Or, a method for manufacturing a radially anisotropic multipolar solid cylindrical sintered magnet is provided, including steps of:

(1) producing a blank of the radially anisotropic multipolar solid cylindrical magnet by the method provided by the present disclosure; and (2) heat treating to solidify an adhesive in the bonded magnet.

In addition, the present disclosure provides a molding device using the method described above, including a mold, a magnetic field generation device and a stress applying device, wherein the magnetic field generation device includes more than two symmetrical outer poles arranged outside a mold cavity, and the oriented magnetic field provided by the magnetic field generation device is discontinuously distributed around the magnet within 360°; and, the mold includes a sleeve, a cavity, an upper ram and a lower ram, without a mold core.

In the present disclosure, the oriented magnetic field may be an electromagnetic field, a permanent magnetic field, or a mixed magnetic field formed by the both.

The present disclosure has the following remarkable technical effects.

(1) The present disclosure innovatively provides a mass production method for radially anisotropic multipolar solid cylindrical magnets with a micro diameter (less than 3 mm or even less), and solves the problem that the existing molded multipolar magnets are seriously limited in their inner diameter. The product can be directly used as a micro-motor rotor, or can be mounted, as a component for providing a permanent magnetic field, on a motor shaft made from other metal materials by forming a hole with any small size (or any small inner diameter) in the center of the product. The present disclosure can produce radially anisotropic ring magnets (multipolar rings) having an inner diameter less than 3 mm or even less for high-precision micro-motors, is of great technological significance in the field of miniature magnet manufacturing, and breaks through the technological barriers to China in magnet manufacturing by ShinEtsu or other enterprises over the past years.

(2) The mold core of the mold commonly used in the prior art is removed, oriented poles, the number of which is the same as that of poles of the radially anisotropic multipolar solid cylindrical magnet, are arranged outside the mold and the sum L of widths or arc lengths of top ends of all the outer oriented poles is set to be greater than or equal to $0.9\pi D$, where D is the outer diameter of a sleeve. In this way, the radially anisotropic multipolar solid cylindrical magnets are produced. The method is simple, practical, and highly controllable during mass production; and the produced magnets are stable and excellent in performance.

(3) During the molding process, by applying an oriented magnetic field that changes by stages, on one hand, the alignment of the easy directions of magnetization of the magnetic particles along the oriented magnetic field is ensured, and it is very advantageous to achieve better magnetic performance; and on the other hand, the electromagnetic energy is saved, and the cost for mass production of magnets is reduced, leading to a promising industrial application prospect.

(4) The method provided by the present disclosure is high in applicability, and suitable for industrially preparing radially anisotropic multipolar solid sintered magnets in low cost and also suitable for preparing bonded magnets, particularly suitable for molding cylindrical or polyhedral solid magnets such as neodymium iron boron, samarium cobalt and ferrite, without any limitations to the type of the used magnetic particles.

BRIEF DESCRIPTION OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

Figure 1:
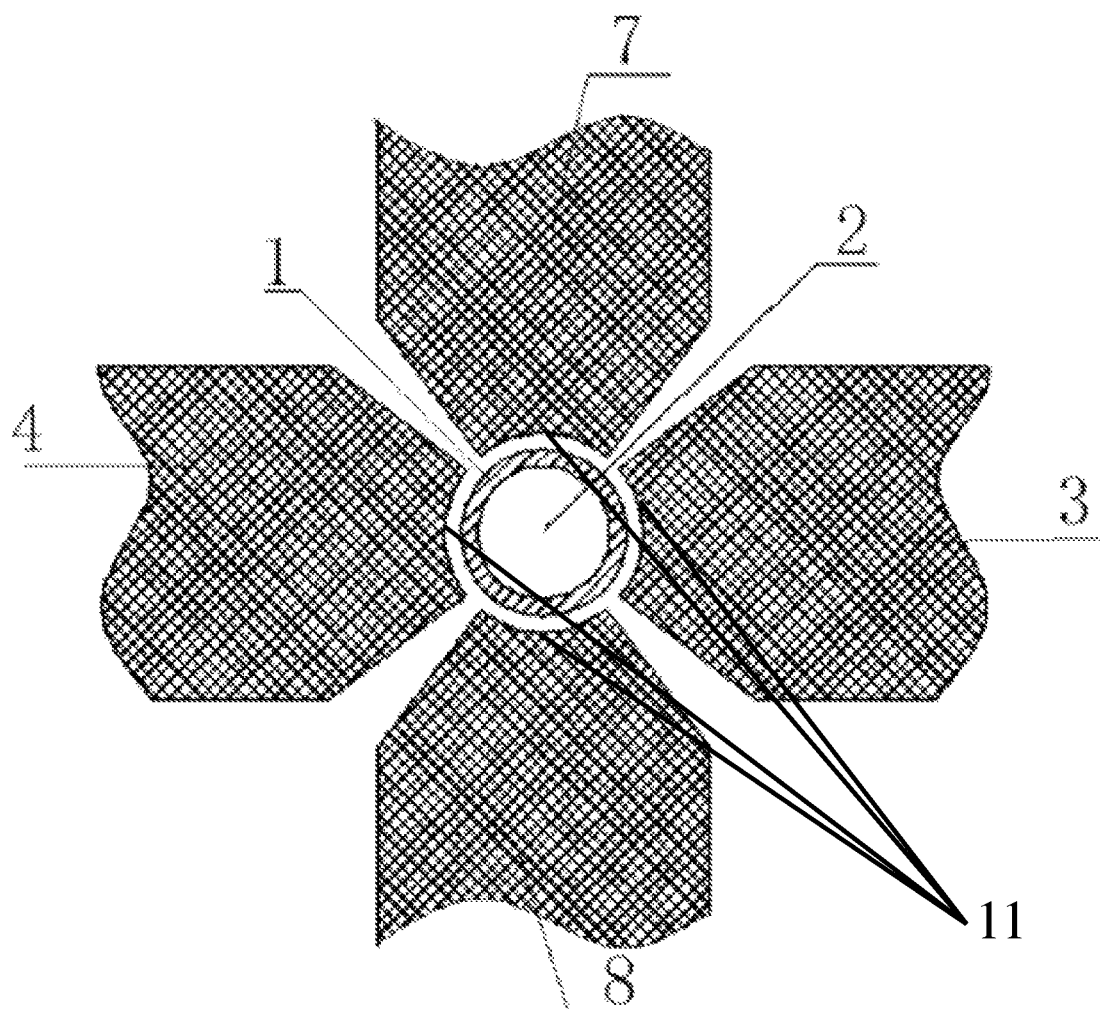
FIG. 1 is a schematic view of preparation of a radially anisotropic solid cylindrical four-polar magnet according to the present disclosure (L≥0.9πD)
Figure 2:
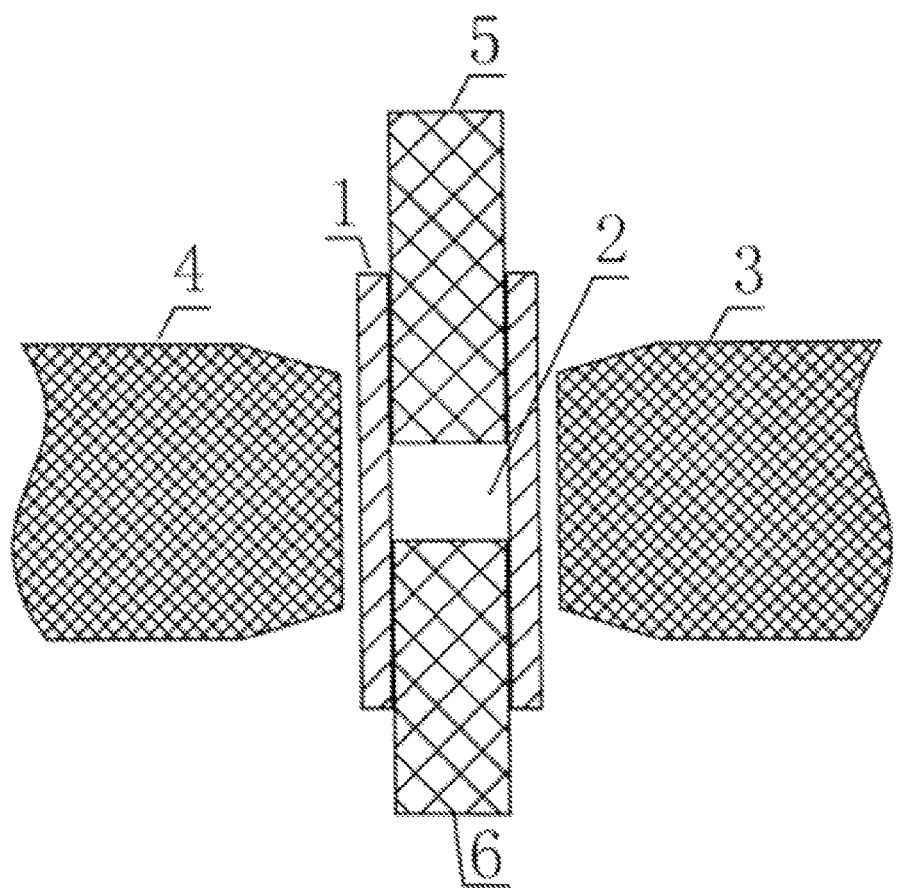
FIG. 2 is a sectional view of preparation of the radially anisotropic solid cylindrical four-polar magnet according to the present disclosure (L≥0.9πD)

in which: 1: mold sleeve; 2: mold cavity; 3, 4, 7 and 8: magnetic poles; 5: upper ram; 6: lower ram; and 11: top ends of outer oriented poles.

DETAILED DESCRIPTION OF THE PRESENT DISCLOSURE

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the disclosure to those skilled in the art. Like reference numerals refer to like elements throughout.

The present disclosure will be further described below in detail by specific implementations, and the protection scope of the present disclosure is not limited thereto.

EMBODIMENT 1

A method for manufacturing a radially anisotropic solid cylindrical quadrupole magnet is provided, including the following steps.

(1) RFeB typed magnetic particles to be molded are prepared. The magnetic particles include the following specific components (wt %): 28% to 33% of rare-earth PrNd, 0.5% to 6% of one or more of Dy, Tb, Ho and Tb, 0% to 3% of Co, 0.95% to 1.2% of B, 2% or less of Nb, 0.1% to 2% of Zr, 2% or less of Cu, 2% or less of Al, and the remaining of Fe and inevitable impurities.

(2) The magnetic particles are melted and cast in a vacuum furnace to obtain an ingot or a rapidly-quenched ribbon.

(3) The ingot is crushed or the rapidly-quenched ribbon is treated by conventional pulverizing methods such as coarse crushing and jet milling to obtain micron-sized magnetic particles. Preferably, the magnetic particles have an average particle size of less than 5.5 μm, preferably about 3.5 μm.

(4) According to the desired shape and size of the magnet to be molded, a corresponding solid cylindrical magnet molding mold is designed and prepared (as shown in FIG. 1). The mold is made from a non-ferromagnetic material, ensuring that the magnetic field can go through the mold cavity from one side to the other side. The mold includes a mold sleeve 1, a mold cavity 2, and upper ram 5 and a lower ram 6, without a mold core.

(5) The prepared molding mold is mounted in the magnetic field generation device. The magnetic field generation device is arranged around the mold, and includes four magnetic poles 3, 4, 7 and 8 arranged at equal intervals. The sum L of widths or arc lengths of top ends 11 of all the outer oriented poles is greater than or equal to 0.9πD, where L is the sum of widths (or arc lengths) of the top ends 11 of the outer oriented poles, (specifically the sum of arc lengths of front ends of the four magnetic poles 3, 4, 7 and 8), and D is the outer diameter of the mold sleeve.

(6) filling the magnetic particles prepared in the step (3) in the mold cavity and the upper ram 5 of the mold is moved to a position in the mold cavity at the same height as upper edge of the poles for the oriented magnetic field or a position slightly lower than the upper edge of the poles for the oriented magnetic field.

(7) The magnetic field generation device is activated to generate an oriented magnetic field having an intensity of 10 KGs to 15 KGs, to fully magnetize the magnetic particles in the mold cavity. The higher the intensity of the magnetic field is, the higher the degree of magnetization of the magnetic particles is.

(8) A second magnetic field having an intensity of 5 KGs to 10 KGs is applied to align the easy directions of magnetization of the magnetic particles along the oriented magnetic field. However, since the arc magnetic field around the poles will be higher in intensity if the intensity of the magnetic field is higher, which affects the alignment of the magnetic particles along the oriented magnetic field, the intensity of the second magnetic field should be lower than that of the first magnetic field. A gradually increased stress is applied to the magnetic particles in the mold cavity by both the upper and lower rams 5, 6 until the stress reaches 20 MPa to 200 MPa, preferably 50 MPa to 150 MPa, and this stress is maintained for a certain period of time. Or, the lower ram is kept unmoved and the upper ram is moved down to apply an increased stress to the magnetic particles in the mold cavity, and this stress is maintained for a certain period of time. When the stress is increased to a level at which the stress is to be maintained, the frictional force $f_{resistance}$ between the anisotropic magnetic particles in the mold cavity is greater than the recovery force $f_{recovery}$ required for the recovery of the easy directions of magnetization of the magnetic particles from an in-order state to an out-of-order state but less than the orientation force $f_{orientation}$ to the anisotropic magnetic particles by the approximately two-dimensional magnetic field, and this stress is maintained for a certain period of time. At this time, 100% (by volume) of anisotropic magnetic particles in the mold cavity are radially anisotropic. The stress maintaining duration is determined according to the desired intensity of the blank. When the magnetic particles cannot recover to the out-of-order state before orientation after leaving the oriented magnetic field, a third magnetic field having an intensity of 0 KGs to 5 KGs is applied. In this stage, the anisotropic magnetic particles in the mold cavity have been radially aligned along the oriented magnetic field.

(9) A stress is continuously applied by the rams until the blank in the mold has a desired density, and a reverse magnetic field having an intensity of 0.01 KGs to 2 KGs or a forward/reverse alternating magnetic field is then applied to demagnetize the blank.

(10) The application of the stress is stopped, and demolding is performed to obtain a molded blank of the solid cylindrical magnet.

(11) The molded magnet blank is sintered and aged, specifically including the following steps of:
(i) vacuumizing, in advance, a sintering furnace to below $10^{-2}$ Pa;
(ii) heating, while vacuumizing, to a sintering temperature of 1000° C. to 1150° C.;
(iii) sintering in vacuum and maintaining the temperature for 30 min to 3 h; (iv) feeding an inert gas (e.g., nitrogen) and cooling; and
(v) aging at 400° C. to 600° C. for 0.5 h to 2 h, or aging at about 850° C. to 950° C. for 0.5 h to 1 h and then aging at 400° C. to 600° C. for 0.5 h to 1 h, to obtain a radially anisotropic multipolar solid cylindrical sintered magnet having an orientation degree greater than 91% and excellent magnetic performance.

In this embodiment, during and after the application of the magnetic field to the magnetic particles, it is not required to rotate, in the magnetic field, the magnetic particles in both the mold and the mold cavity, and it is also not required to rotate the oriented magnetic field.

Figure 3:
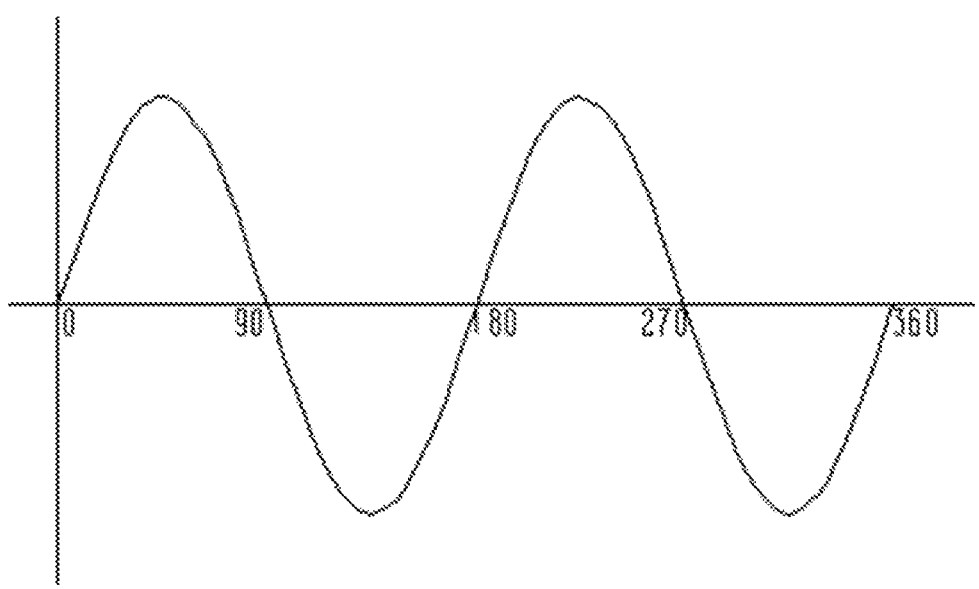
FIG. 3 shows a magnetization waveform of the radially anisotropic solid cylindrical four-polar magnet prepared by a method according to the present disclosure (L≥0.9πD)

FIG. 3 shows a magnetization waveform of four poles of the radially anisotropic solid cylindrical magnet produced in this embodiment.

EMBODIMENT 2

A radially anisotropic multipolar solid cylindrical bonded magnet is manufactured by a process the same as that in Embodiment 1. This embodiment differs from Embodiment 1 in that an adhesive is added in advance to the magnetic particles obtained in the step (6), and conventional heat treatment is performed in the step (11) to solidify the adhesive in the bonded magnet. In this way, a multipolar solid cylindrical bonded magnet having an orientation degree greater than 90% and excellent magnetic performance is obtained.

It is to be particularly noted that the present disclosure can also produce radially anisotropic multipolar cylindrical or polyhedral magnets such as samarium cobalt, ferrite and bonded neodymium iron boron by changing the type of anisotropic magnetic particles in the mold cavity.

The forgoing embodiments merely show preferred implementations of the present disclosure, and should not be interpreted as limiting the protection scope of the present disclosure. It is to be noted that various alterations, replacements and improvements may be made by a person of ordinary skill in the art without departing from the concept of the present disclosure, and these alterations, replacements and improvements shall fall into the protection scope of the present disclosure.

What is claimed is:

1. A method for molding a radially anisotropic multipolar solid cylindrical magnet, wherein a mold is prepared with a mold cavity; outer oriented poles, the number of which is the same as that of poles of the radially anisotropic multipolar solid cylindrical magnet, are arranged outside the mold; during and after the application of a magnetic field to magnetic particles, the mold and magnetic particles in a mold cavity are not being rotated in the magnetic field, and oriented magnetic field is also not being rotated; the sum L of widths or arc lengths of top ends of all the outer oriented poles is greater than or equal to $0.9\pi D$, where D is the outer diameter of a mold sleeve.

2. The method according to claim 1, wherein the mold comprises a mold cavity, an upper ram and a lower ram; an oriented magnetic field generation device comprises an even number ($\geq 2$) of symmetrical outer poles arranged outside the mold; and, the sum L of widths or arc lengths of top ends of all the outer oriented poles is greater than or equal to $0.9\pi D$, where D is the outer diameter of the mold sleeve.

3. A method for manufacturing a radially anisotropic multipolar solid cylindrical magnet, comprising steps of:
(1) molding a magnet blank by the method according to claim 2; and
(2) sintering and aging, comprising specific steps of:
(i) vacuumizing in advance;
(ii) heating, while vacuumizing, to a sintering temperature of 1000° C. to 1150° C.;
(iii) sintering in vacuum and maintaining the temperature;
(iv) feeding an inert gas and cooling; and
(vi) aging at 400° C. to 600° C., or aging at about 850° C. to 950° C. and then aging at 400° C. to 600° C.

4. A molding device using the method according to claim 3, comprising a mold, an oriented magnetic field generation device and a stress applying device, wherein the mold comprises a mold cavity, an upper ram and a lower ram; the oriented magnetic field generation device comprises oriented poles, the number of which is the same as that of poles of a radially anisotropic multipolar solid cylindrical magnet, arranged outside the mold; and, the sum L of widths or arc lengths of top ends of all the oriented poles is greater than or equal to $0.9\pi D$, where D is the outer diameter of a mold sleeve.

5. A method for manufacturing a radially anisotropic multipolar solid cylindrical magnet, comprising steps of:
(1) molding a magnet blank by the method according to claim 2; and
(2) heat treating to solidify an adhesive in the bonded magnet.

6. A molding device using the method according to claim 5, comprising a mold, an oriented magnetic field generation device and a stress applying device, wherein the mold comprises a mold cavity, an upper ram and a lower ram; the oriented magnetic field generation device comprises oriented poles, the number of which is the same as that of poles of a radially anisotropic multipolar solid cylindrical magnet, arranged outside the mold; and, the sum L of widths or arc lengths of top ends of all the oriented poles is greater than or equal to $0.9\pi D$, where D is the outer diameter of a mold sleeve.

7. A molding device using the method according to claim 2, comprising a mold, an oriented magnetic field generation device and a stress applying device, wherein the mold comprises a mold cavity, an upper ram and a lower ram; the oriented magnetic field generation device comprises oriented poles, the number of which is the same as that of poles of a radially anisotropic multipolar solid cylindrical magnet, arranged outside the mold; and, the sum L of widths or arc lengths of top ends of all the oriented poles is greater than or equal to $0.9\pi D$, where D is the outer diameter of a mold sleeve.

8. A molding device using the method according to claim 1, comprising a mold, an oriented magnetic field generation device and a stress applying device, wherein the mold comprises a mold cavity, an upper ram and a lower ram; the oriented magnetic field generation device comprises oriented poles, the number of which is the same as that of poles of a radially anisotropic multipolar solid cylindrical magnet, arranged outside the mold; and, the sum L of widths or arc lengths of top ends of all the oriented poles is greater than or equal to $0.9\pi D$, where D is the outer diameter of a mold sleeve.

9. A method for molding a radially anisotropic multipolar solid cylindrical magnet, comprising following steps of:
(1) preparing a mold with a mold cavity without a mold core;
(2) arranging, around the prepared mold, oriented poles, the number of which is the same as that of poles of the radially anisotropic multipolar solid cylindrical magnet, the sum L of widths or arc lengths of top ends of all the outer oriented poles being greater than or equal to 0.971 D, where L is the sum of widths or arc lengths of top ends of all the outer oriented poles and D is the outer diameter of a mold sleeve; filling anisotropic magnetic particles in a mold cavity, and moving an upper ram of the mold to a proper position, this position being a position at the same height as an upper edge of poles for an oriented magnetic field or a position slightly lower than the upper edge of the poles for the oriented magnetic field;
(3) applying a first magnetic field to fully magnetize magnetic particles in the mold cavity;
(4) applying a second magnetic field, applying an increased stress to the magnetic particles in the mold cavity by both the upper and lower rams and maintaining this stress for a certain period of time to obtain a blank; or, by keeping the lower ram unmoved, moving the upper ram down to apply an increased stress to the magnetic particles in the mold cavity and maintaining this stress for a certain period of time, the stress being 20 MPa to 200 MPa;
(5) In the step (4), when the magnetic particles cannot recover to an out-of-order state before orientation after leaving the oriented magnetic field, applying a third magnetic field, and continuously applying a stress by the rams until the blank has a desired density;
(6) applying a fourth magnetic field to demagnetize the blank; and applying a reverse magnetic field to the blank in the mold cavity to demagnetize the blank, or applying a forward/reverse alternating magnetic field to demagnetize the blank in the mold cavity; and
(7) stopping the application of stress, and demolding to obtain the blank.

10. The method according to claim 9, wherein, in the step (4), the intensity of the applied second magnetic field is lower than that of the first magnetic field, the intensity of the first magnetic field being 1 to 3 times but excluding 1 times of that of the second magnetic field; in the step (5), the intensity of the applied third magnetic field is 1 to 0 times of that of the second magnetic field; and, in the step (6), the applied four magnetic field is a reverse magnetic field or forward/reverse alternating magnetic field having an intensity that is 0.5 to 0.01 times of that of the second magnetic field.

11. A method for manufacturing a radially anisotropic multipolar solid cylindrical magnet, comprising steps of:
(1) molding a magnet blank by the method according to claim 10; and
(2) sintering and aging, preferably comprising specific steps of:
(i) vacuumizing in advance;
(ii) heating, while vacuumizing, to a sintering temperature of 1000° C. to 1150° C.;
(iii) sintering in vacuum and maintaining the temperature;
(iv) feeding an inert gas and cooling; and
(vi) aging at 400° C. to 600° C., or aging at about 850° C. to 950° C. and then aging at 400° C. to 600° C.

12. A method for manufacturing a radially anisotropic multipolar solid cylindrical magnet, comprising steps of:
(1) molding a magnet blank by the method according to claim 10; and
(2) heat treating to solidify an adhesive in the bonded magnet.

13. A molding device using the method according to claim 10, comprising a mold, an oriented magnetic field generation device and a stress applying device, wherein the mold comprises a mold cavity, an upper ram and a lower ram, without a mold core; the oriented magnetic field generation device comprises oriented poles, the number of which is the same as that of poles of a radially anisotropic multipolar solid cylindrical magnet, arranged outside the mold; and, the sum L of widths or arc lengths of top ends of all the oriented poles is greater than or equal to $0.9\pi D$, where D is the outer diameter of a mold sleeve.

14. A method for manufacturing a radially anisotropic multipolar solid cylindrical magnet, comprising steps of:
(1) molding a magnet blank by the method according to claim 9; and
(2) sintering and aging, comprising specific steps of:
(i) vacuumizing in advance;
(ii) heating, while vacuumizing, to a sintering temperature of 1000° C. to 1150° C.;
(iii) sintering in vacuum and maintaining the temperature;
(iv) feeding an inert gas and cooling; and
(vi) aging at 400° C. to 600° C., or aging at about 850° C. to 950° C. and then aging at 400° C. to 600° C.

15. A method for manufacturing a radially anisotropic multipolar solid cylindrical magnet, comprising steps of:
(1) molding a magnet blank by the method according to claim 9; and
(2) heat treating to solidify an adhesive in the bonded magnet.

16. A molding device using the method according to claim 9, comprising a mold, an oriented magnetic field generation device and a stress applying device, wherein the mold comprises a mold cavity, an upper ram and a lower ram; the oriented magnetic field generation device comprises oriented poles, the number of which is the same as that of poles of a radially anisotropic multipolar solid cylindrical magnet, arranged outside the mold; and, the sum L of widths or arc lengths of top ends of all the oriented poles is greater than or equal to $0.9\pi D$, where D is the outer diameter of a mold sleeve.

17. The method according to claim 9, wherein in the step (4), the increased stress is 50 MPa to 150 MPa.

* * * * *